F. L. CLARK.
FLUID PRESSURE BRAKE.
APPLICATION FILED NOV. 2, 1906.
1,104,775. Patented July 28, 1914.
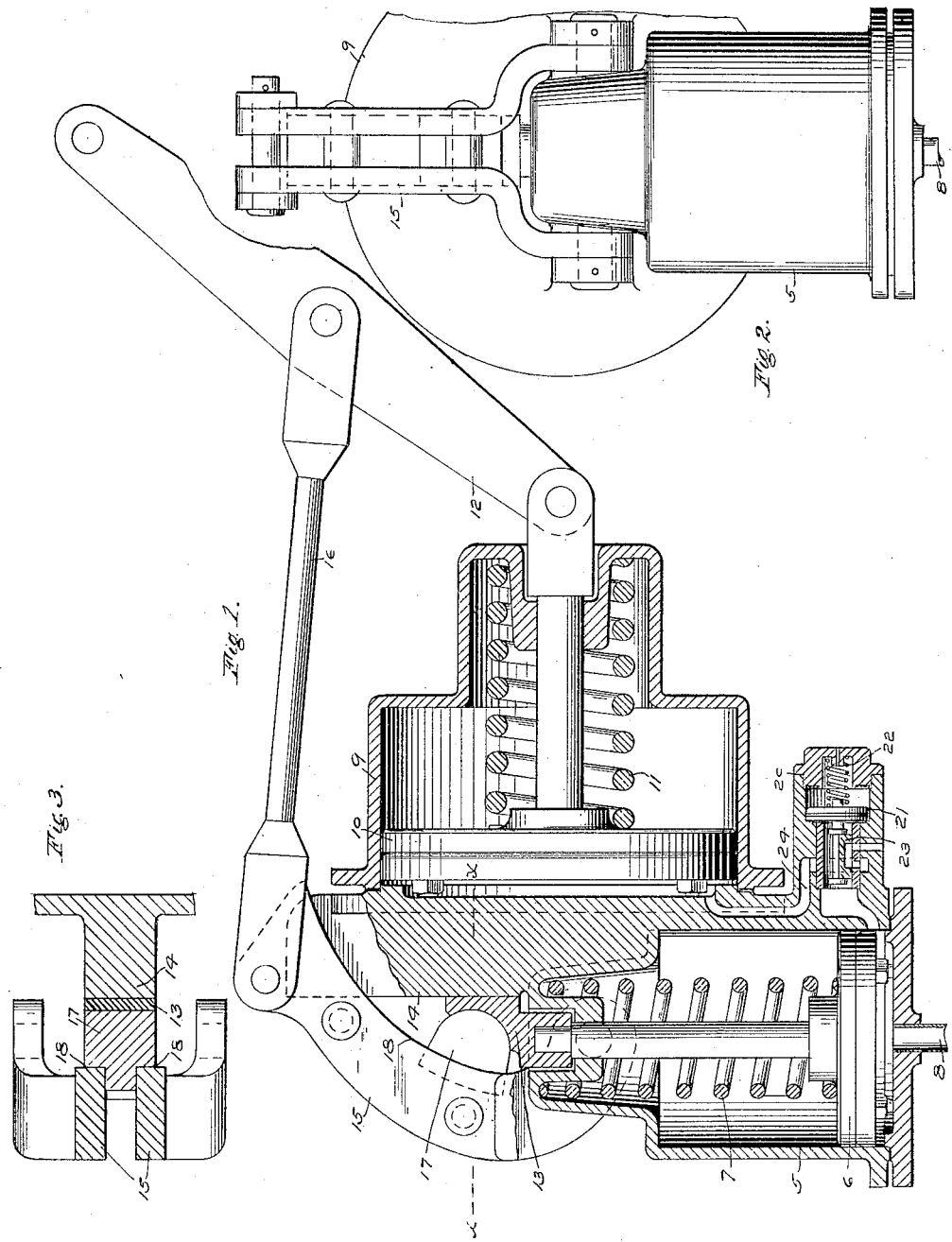
WITNESSES
INVENTOR
Francis L. Clark
by E. Wright
Att'y.

UNITED STATES PATENT OFFICE.

FRANCIS L. CLARK, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,104,775.      Specification of Letters Patent.      Patented July 28, 1914.

Application filed November 2, 1906. Serial No. 341,668.

*To all whom it may concern:*

Be it known that I, FRANCIS L. CLARK, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brakes, and more particularly to that type of apparatus in which two brake cylinders are employed, one of smaller diameter into which the fluid under pressure is first admitted for the purpose of taking up the slack in the brake-rigging and bringing the brake shoe against the wheels, and a second and larger brake cylinder to which the fluid under pressure is then supplied for exerting the final application of maximum power to the rigging and brake shoes. By means of this construction the advantages of the maximum braking power of the large brake cylinder are obtained with the expenditure of a minimum quantity of compressed fluid since the first cylinder, in which the piston travel is adequate for taking up the slack and applying the brake shoe to the wheels, is of small capacity, and the travel of the piston in the large cylinder is very short, such as results only from the additional stretching of the brake rigging, due to the greater power thus applied. With this type of apparatus, it is necessary to provide some form of mechanism for connecting the pistons of the respective cylinders to the brake rigging in such a manner that the large piston may exert its pressure upon the rigging at the point to which it has been actuated or applied by the first piston. Various forms of clutch devices have been proposed for connecting the large piston to the brake rigging; and a toggle lever connection has also been employed actuated by the small piston; but the clutches have been found to be objectionable, and in the use of the toggle lever, it sometimes happens that there is not enough slack to allow a sufficient travel of the small piston to straighten the toggle joint, in which case the small piston is liable to be forced back in its cylinder by the reaction from the power applied to the large piston, which must then make a complete traverse to take up all the slack in the brake rigging and apply the brake shoes to the wheels.

The principal object of my present invention is to provide an improved form of mechanism for connecting the brake pistons to the rigging, whereby the smaller primary piston may make any length of travel, either long or short, sufficient to bring the brake blocks against the wheels, and the large or secondary piston then acts positively upon the rigging regardless of the length of travel of the primary piston and without forcing the same back in its cylinder.

According to its preferred form, my invention comprises a wedge mechanism, or equivalent device, through which power on the small piston acts on the brake rigging to take up the slack and so designed that when the small piston has made its traverse and the power is applied to the large piston, it will then exert its force upon the brake rigging in the position to which it has been drawn up by the small piston, and without danger of forcing the small piston back in its cylinder.

In the accompanying drawing; Figure 1 is a sectional view of two brake cylinders and connecting mechanism, illustrating one form of construction embodying my improvements; Fig. 2 an end view of the brake cylinders; and Fig. 3 a section of the wedge mechanism taken on the line $x$—$x$ of Fig. 1.

As shown in the drawing, the two brake cylinders are located at right angles to each other, although they may be arranged in any other suitable or preferred relation.

The small, or primary brake cylinder, 5, contains piston 6 and spring 7 and has an inlet pipe or port 8, through which air or other fluid under pressure may be supplied from a brake valve, triple valve or other device for controlling the application of the brakes. The second and larger brake cylinder, 9, contains release spring 11, and piston 10, preferably connected to the cylinder lever 12 of the brake rigging.

Any desired form of wedge device or equivalent mechanism may be employed and actuated by the primary brake piston for drawing on the brake rigging to take up the slack and bring the brake shoes against the wheels; but as illustrated in the drawing this device comprises a wedge block 13 operated by the piston 6 to slide upon the plane surface of the guide 14, which may be conveniently mounted on the head of the large cylinder. This wedge block coöperates with a curved lever 15, which is preferably bifurcated and pivoted at one end to the end of the small cylinder 5, and connected at the other end by rod 16 to the intermediate pivot or fulcrum of the cylinder lever 12. A bearing block 17 may be pivotally mounted on the wedge block for engaging the curved bearing surface 18 of the lever 15, which curved surface is so calculated that the normal outward travel of the small brake piston and the wedge block operates through rod 16 to move the lever 12 of the brake rigging sufficiently to take up the slack and force the brake shoes against the wheels with a certain pressure. During this movement the cylinder lever turns about its lower connection to the large piston as a fulcrum, then when the compressed air is admitted to the large cylinder and its piston is forced out the pressure is exerted upon the lower end of the lever 12, which then turns about its pivoted connection to rod 16 as a fulcrum and thereby applies its force to the brake rigging in the position to which it has been previously stretched by the movement of the primary piston.

The curved lever 15, with its bearing surface, is so designed that the power exerted thereon by the small piston is always greater than the component of the force from the large piston, which reacts through said wedge mechanism in the reverse direction when air is supplied to the large cylinder and the brake lever is turned about its connection with rod 16 as a fulcrum. By means of this construction the small piston will not be forced back in its cylinder by the application of power to the large piston, but the fulcrum of the brake lever will be held at whatever position it is advanced by the application of the brake shoes by the small piston and the greater power from the large piston will then be applied at that position of the brake rigging. This will be the same whatever may be the length of travel made by the small piston, consequently it is not necessary that the small piston should make a predetermined length of stroke in order that the power of the large piston may be properly applied to the brake rigging in its advanced position.

Any suitable or preferred means may be employed for admitting air under pressure to the large cylinder after the small primary piston has made its stroke and brought the brake shoes against the wheels, such as a port controlled by said small piston or a valve device 20, as indicated in Fig. 1, comprising a piston 21, spring 22 and slide valve 23, which operates when the pressure in the small brake cylinder rises to a predetermined degree, to open a supply port 24 leading into the large brake cylinder. This slide valve may also control an exhaust port from the large brake cylinder to the atmosphere, and the spring may be set at whatever degree of brake cylinder pressure it is desired to open the supply port to the large brake cylinder.

It will now be apparent that by means of my improvement the advantages of the greater braking power, due to the large piston, are obtained by the use of a minimum quantity of compressed air.

Having now described my invention, what I claim as new and desire to secure by Letters Patent, is:—

1. In a fluid pressure brake, the combination with a primary brake cylinder and piston and a second opposing brake cylinder and piston, of a driving connection between the primary piston and the brake rigging and a movable resistance wedge for opposing the backward movement of the driving connection to thereby prevent lost motion of the second piston when its pressure is exerted upon the brake rigging.

2. In a fluid pressure brake, the combination with a brake cylinder and piston for exerting a preliminary pressure on the brake rigging and a second brake cylinder and piston opposing the first brake cylinder and piston for exerting the final pressure, of an operating connection between the first piston and the brake rigging and a movable wedge for opposing the backward movement of the operating connection in any position of the first piston to thereby prevent lost motion of the second piston upon the application of pressure to said second piston.

3. In a fluid pressure brake, the combination with a brake cylinder and piston for exerting a preliminary pressure on the brake rigging and a second brake cylinder and piston opposing the first brake cylinder and piston for exerting the final pressure, of a driving connection between the first piston and the brake rigging and a movable wedge for opposing the backward movement of the driving connection.

4. In a fluid pressure brake, the combination with a small or primary brake cylinder and piston for taking up the slack and bringing the shoes against the wheels, and a larger brake cylinder and piston for applying the final pressure to the brake rigging, of a wedge mechanism whereby the large piston may act positively on the rigging at whatever position it is applied by the small piston.

5. In a fluid pressure brake, the combination with a small brake cylinder and piston, and a larger brake cylinder and piston, of a wedge mechanism operating at the time of movement of the small piston for preventing lost motion of the large piston when its pressure is exerted upon the brake rigging.

6. In a fluid pressure brake, the combination with a small brake cylinder and piston to which the fluid is first admitted, and a larger brake cylinder and piston to which fluid is subsequently admitted, of a wedge mechanism operated by the movement of the small piston for setting up the brake rigging to an applied position.

7. In a fluid pressure brake, the combination with a small brake cylinder and piston, and a larger brake cylinder and piston, of a wedge mechanism through which the small piston acts on the brake rigging to take up the slack and apply the brake shoes to the wheels without moving the large piston.

8. In a fluid pressure brake, the combination with a small brake cylinder and piston, and a larger brake cylinder and piston, of a brake lever operated directly by the large piston, and a wedge mechanism operated by the small piston and connected to another point of said brake lever.

9. In a fluid pressure brake, the combination with a small brake cylinder and piston, and a larger brake cylinder and piston, of a wedge mechanism actuated by the small piston and comprising a wedge block and a lever having a bearing surface for engaging therewith.

10. In a fluid pressure brake, the combination with a small brake cylinder and piston, and a larger brake cylinder and piston, of a wedge mechanism actuated by the small piston and comprising a wedge block and a lever pivoted at one end to the small brake cylinder and having a curved bearing surface for engaging the wedge.

11. In a fluid pressure brake, the combination with a small brake cylinder and piston, and a larger brake cylinder and piston, of a wedge mechanism actuated by the small piston and comprising a wedge block, a guide surface therefor mounted on the cylinder, and a curved lever having a bearing surface for engaging the wedge.

In testimony whereof I have hereunto set my hand.

FRANCIS L. CLARK.

Witnesses:
R. F. EMERY,
J. S. CUSTER.

Copies of this patent may be obtained for five cents each, by addressing the "Commissioner of Patents, Washington, D. C."